United States Patent
Savio et al.

(10) Patent No.: US 7,196,915 B2
(45) Date of Patent: Mar. 27, 2007

(54) INTEGRATED TRANSFORMER BASED STEP-UP CONVERTER

(75) Inventors: Alessandro Savio, Manerbio (IT); Anna Richelli, Brescia (IT); Zsolt Miklos Kovacs Vajna, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/341,615

(22) Filed: Jan. 13, 2003

(65) Prior Publication Data
US 2004/0135568 A1    Jul. 15, 2004

(51) Int. Cl.
*H02M 3/335* (2006.01)

(52) U.S. Cl. ............... 363/22; 363/18; 363/23
(58) Field of Classification Search ................ 363/22, 363/18, 19, 23
See application file for complete search history.

(56) References Cited

U.S. PATENT DOCUMENTS

| | | | |
|---|---|---|---|
| 5,053,727 A * | 10/1991 | Jann et al. ................ 331/62 |
| 5,216,585 A * | 6/1993 | Yasumura ................ 363/19 |
| 5,367,224 A * | 11/1994 | Pacholok ................ 315/219 |
| 5,920,235 A * | 7/1999 | Beards et al. ............ 331/108 D |
| 5,969,590 A * | 10/1999 | Gutierrez ................ 336/200 |
| 6,055,162 A * | 4/2000 | Tarrillo et al. ............ 363/25 |
| 6,091,210 A * | 7/2000 | Cavolina ................ 315/307 |
| 6,108,219 A * | 8/2000 | French ................ 363/23 |
| 6,266,254 B1 * | 7/2001 | Ohtake ................ 363/22 |
| 6,456,167 B1 * | 9/2002 | Huang ................ 331/46 |
| 6,639,481 B1 * | 10/2003 | Ravi et al. ............ 331/177 V |
| 6,680,655 B2 * | 1/2004 | Rogers ................ 331/109 |
| 6,720,705 B2 * | 4/2004 | Nakatsuka et al. .... 310/316.01 |
| 6,850,122 B2 * | 2/2005 | Ravi et al. ................ 331/46 |
| 6,859,112 B2 * | 2/2005 | Mason ................ 331/117 FE |
| 6,876,528 B2 * | 4/2005 | Macbeth ................ 361/42 |
| 7,023,315 B2 * | 4/2006 | Yeo et al. ................ 336/200 |

* cited by examiner

*Primary Examiner*—Bao Q. Vu
(74) *Attorney, Agent, or Firm*—Jenkens & Gilchrist, PC

(57) ABSTRACT

A step-up converter based on an integrated transformer, comprising a self-resonating oscillator circuit that has inductive elements constituted by primary and secondary windings of at least one first transformer, the self-resonating oscillator circuit being powered by an external supply voltage.

31 Claims, 5 Drawing Sheets

INTEGRATED TRANSFORMER BASED STEP-UP CONVERTER

BACKGROUND OF THE INVENTION

The present invention relates to a step-up converter based on an integrated transformer. More particularly, the invention relates to a step-up converter based on an integrated transformer that can be used as an alternative or a complement to conventional capacitive charge pump circuits.

In many fields of integrated electronics, as in the case of memory integration, some fundamental operations cannot be performed by applying only the low voltages of the power supply: one example is given by the write and delete operations of Flash and EEPROM memories. This aspect becomes more important in the field of microcontrollers with integrated Flash memories, where increasingly extreme scaling of the supply voltages contrasts with a substantial stability of the voltage levels required for programming. The task of capacitive charge pumps is therefore to generate voltage values higher than the power supply by using capacitors as storage systems in which the charge that will accumulate toward the output is made to pass. One of the most significant parameters for describing the performance of a charge pump is its efficiency, whose maximization has been the focus of the efforts made in recent years to improve known voltage booster architectures.

One characteristic that is common to all charge pumps is that it is impossible to achieve a complete charge transfer from one stage to the next, due to the loss of a threshold voltage of each one of the MOS used as diodes or due to the excessive channel resistance of the pass transistors. In particular, when the transistors are connected as diodes, the asymptotic charging level reached between one stage and the next is equal to the supply voltage minus a threshold $V_T$, which becomes increasingly important as one approaches the last stages of the pump, where the body effect becomes predominant.

In the current background art, the charge pumps most frequently used to generate the high voltage levels required for the operation of non-volatile memories are based on control systems with four phases without voltage boosting. One rather valid architecture is also the one that uses a simple system with two phases, assisted by an operating frequency that is higher than the ones normally used.

The typical diagram of a four-phase NMOS charge pump is shown in FIG. 1, which shows generic stages. In addition to the gate precharge circuits, there are often branches for precharging to $V_{dd}$ for the intermediate nodes of the pump.

Each stage is composed of a boost capacitor C(k) and by a pass transistor M(k); the figure also shows a switch M'(k), whose purpose is to precharge the node PRE(k) and the four phases A, B, C and D, whose timing is shown in FIG. 2. Both the boost phases B and D and the control phases A and C vary between 0 and $V_{dd}$. When B goes high, the phase D has not yet reached 0 and the transistor M'(k) remains on, allowing to precharge the mode PRE(k) up to the potential value of the node k. Then C switches, and D reaches the low logic value, switches off M'(k) and allows the isolation of the node PRE(k). The phase C provides a miniboost effect on the gate of the transistor M(k), switching it on and partly limiting the problems linked to threshold voltage loss.

The packet of charge is transferred from the capacitor C(k) to the capacitor of the next stage C(k+1). When C and D switch again, the pass transistor opens and the node PRE(k) returns to the potential of the node k by virtue of M'(k) as soon as B has returned to the low value. In order to minimize the problems introduced by the body effect on the increase in the threshold voltages, suitable circuits for biasing the NMOS that provide the pass transistors are used, utilizing a partitioned version of the output voltage of the pump.

The architecture with two phases with voltage boost of the controls and low-voltage transistors is based on the use of low-voltage transistors for the execution of the individual stages and furthermore utilizes higher operating frequencies than used in conventional solutions (100 MHz instead of 10–20 MHz). The output resistance of a capacitive charge pump can in fact be reduced by increasing the operating frequency and by using MOS transistors with a low threshold to speed up the charge transfer operations. However, this type of approach forces the use of low-voltage transistors, which due to problems linked to possible oxide punch-through cannot withstand at their terminals voltages higher than the power supply. The single stage and a general diagram of a three-stage charge pump are shown in FIGS. 3 and 4. Each stage allows to obtain, in theory, a gain equal to the supply voltage, is provided without resorting to high-voltage MOS and is driven by two phases which must be perfectly nonoverlapping.

After an initial transient, a stationary situation is established. During the first half-cycle, ck=$V_{dd}$, ck_neg=0, M0 and M6 are on, M1 and M5 are off; C1 is charged to Vlow and Vhigh is charged to the value stored in C0 (i.e., Vlow) plus $V_{dd}$. During the second half of the cycle, ck=0, ck_neg=$V_{dd}$, M0 and M6 are off, M1 and M5 are on; C0 is charged to Vlow and Vhigh is charged to Vlow+$V_{dd}$. In this manner, a gain in voltage between Vlow and Vhigh is achieved whose ideal value is $V_{dd}$ and can be approximated, ignoring losses due to an insufficiently high overdrive, as:

$$\Delta v = V_{dd} \cdot \frac{C}{C + C_{par}} - R_{out} \cdot I_{out}$$

$$R_{out} = \frac{1}{f \cdot C} + R_{switch}$$

where C=C0=C1; Cpar indicates the parasitic capacitances of the internal nodes of the individual stage, Rout is the output resistance of the charge pump, and Rswitch is the channel resistance of each MOS.

If n stages are cascade-connected, one obtains:

$$V_{out} = V_{dd} + n \cdot \Delta v$$

The main cause of power dissipation is constituted by the driving stages that lie downstream of the clocks. The formula used to calculate the efficiency is given hereafter:

$$\eta = 100\% \cdot \frac{P_{out}}{P_{in}} = 100\% \cdot \frac{V_{out} \cdot I_{out}}{V_{dd} \cdot \overline{I}(V_{dd})}$$

where $I(V_{dd})$ and $V_{out}$ are the average values of $I(V_{dd})$ and $V_{out}$.

A series of measurements was taken on 3- and 5-stage pumps implemented in 0.18-μm technology (6 levels of metal) with NMOS in triple well and supply voltages between 1.6 and 2V as the current drawn at the output and the frequency of the two phases varied. The results have shown a bell-curve behavior of the efficiency as the output current varies, with a peak around 350 μA. Other advantages of the high frequencies used are a rather short rise time and a reduction in the ripple on the output voltage.

The drawbacks of conventional capacitive charge pump circuits are high chip area occupation, long output rise time, and the lack of the possibility to adjust the output voltage of said circuit.

SUMMARY OF THE INVENTION

The aim of the present invention is to provide a step-up converter based on an integrated transformer that can be used as an alternative or complement to conventional capacitive charge pump circuits.

Within this aim, an object of the present invention is to provide a step-up converter based on an integrated transformer that allows to achieve an area reduction with respect to known types of circuit.

Another object of the present invention is to provide a step-up converter based on an integrated transformer that has a shorter output rise time than known types of circuit.

Another object of the present invention is to provide a step-up converter based on integrated transformer that allows to have output voltage adjustment.

Another object of the present invention is to provide a step-up converter based on an integrated transformer that is highly reliable, relatively simple to provide and at competitive costs.

This aim and these and other objects that will become better apparent hereinafter are achieved by a step-up converter based on an integrated transformer, comprising a self-resonating oscillator circuit that has inductive elements constituted by primary and secondary windings of at least one first transformer, said self-resonating oscillator circuit being powered by an external supply voltage.

BRIEF DESCRIPTION OF THE DRAWINGS

Further characteristics and advantages of the invention will become better apparent from the description of preferred but not exclusive embodiments of the converter according to the present invention, illustrated only by way of non-limitative example in the accompanying drawings, wherein.

DESCRIPTION OF THE PREFERRED EMBODIMENTS

Figure 6:
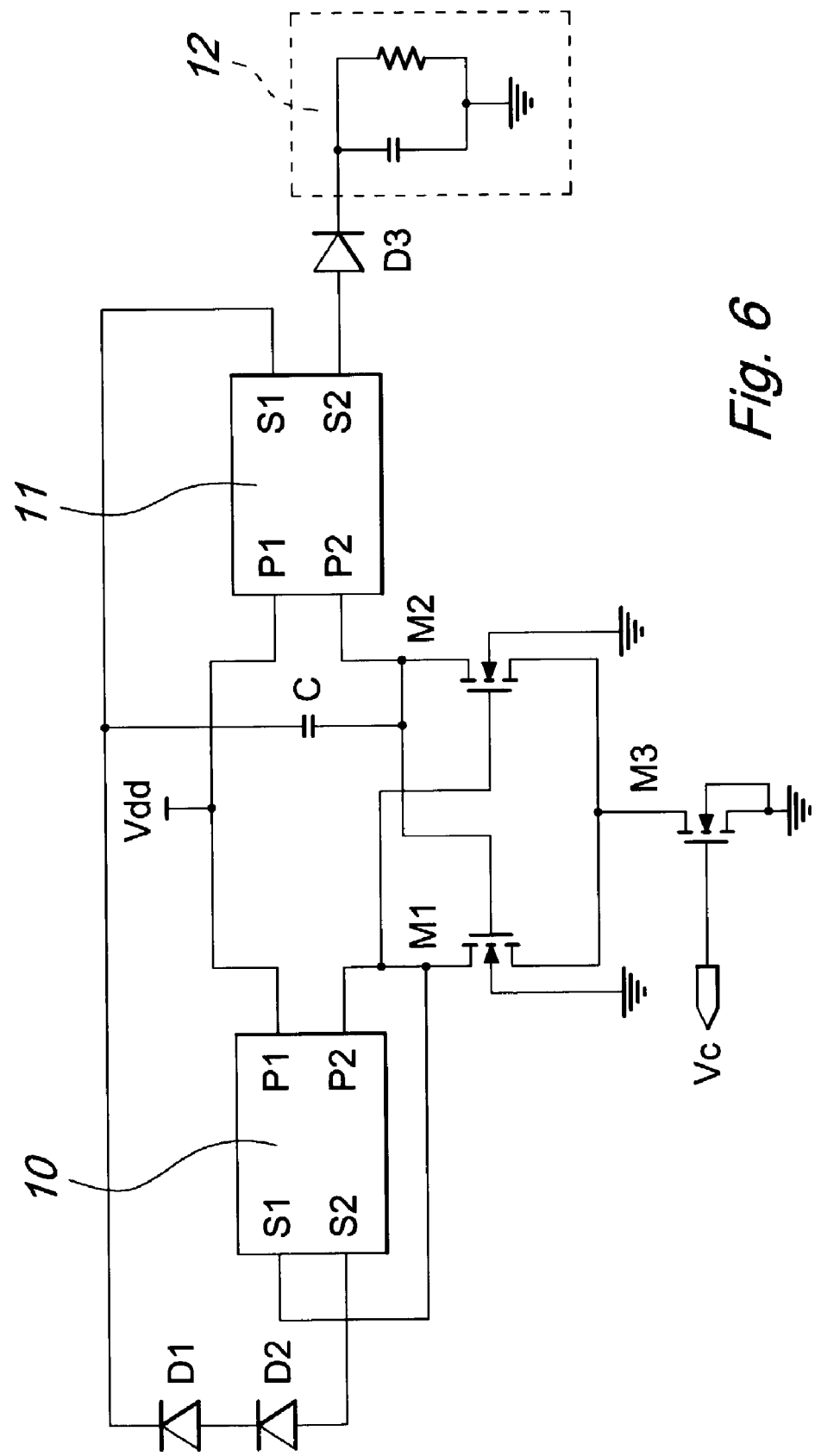
FIG. 6 is a schematic view of the step-up converter according to a first embodiment of the present invention.

With reference to the cited figures, and particularly with reference to FIGS. 6 to 9, the step-up converter according to a first embodiment is shown in FIG. 6.

Figure 1:
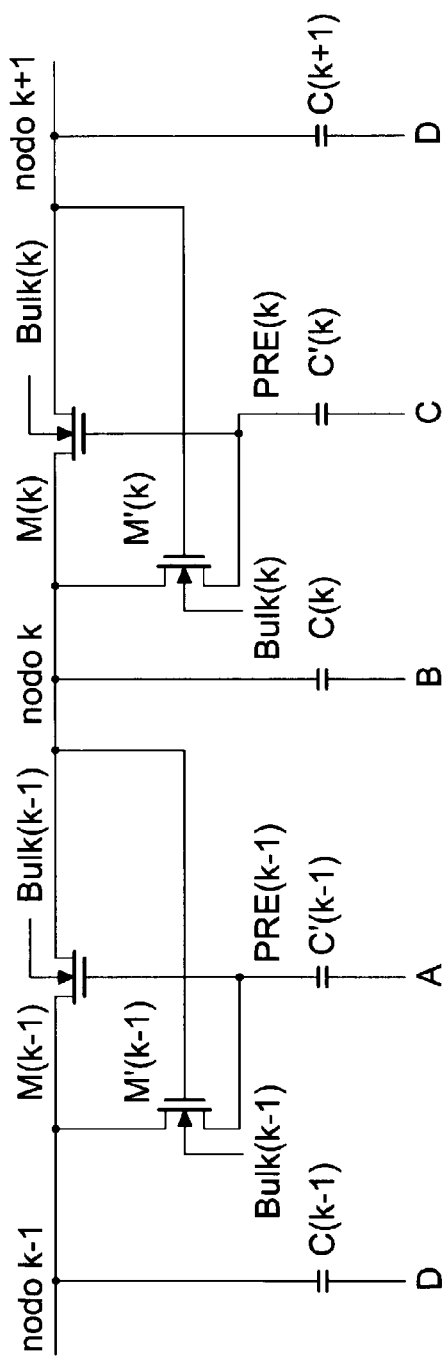
FIG. 1 is a view of generic stages of a known type of four-phase charge pump circuit.
Figure 2:
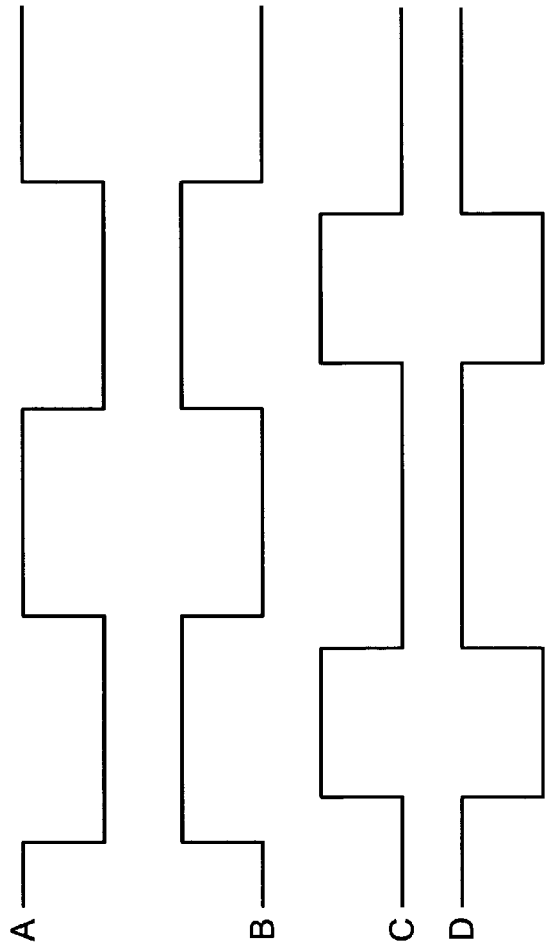
FIG. 2 is a view of the timing of the four-phase charge pump circuit of FIG. 1.
Figure 3:
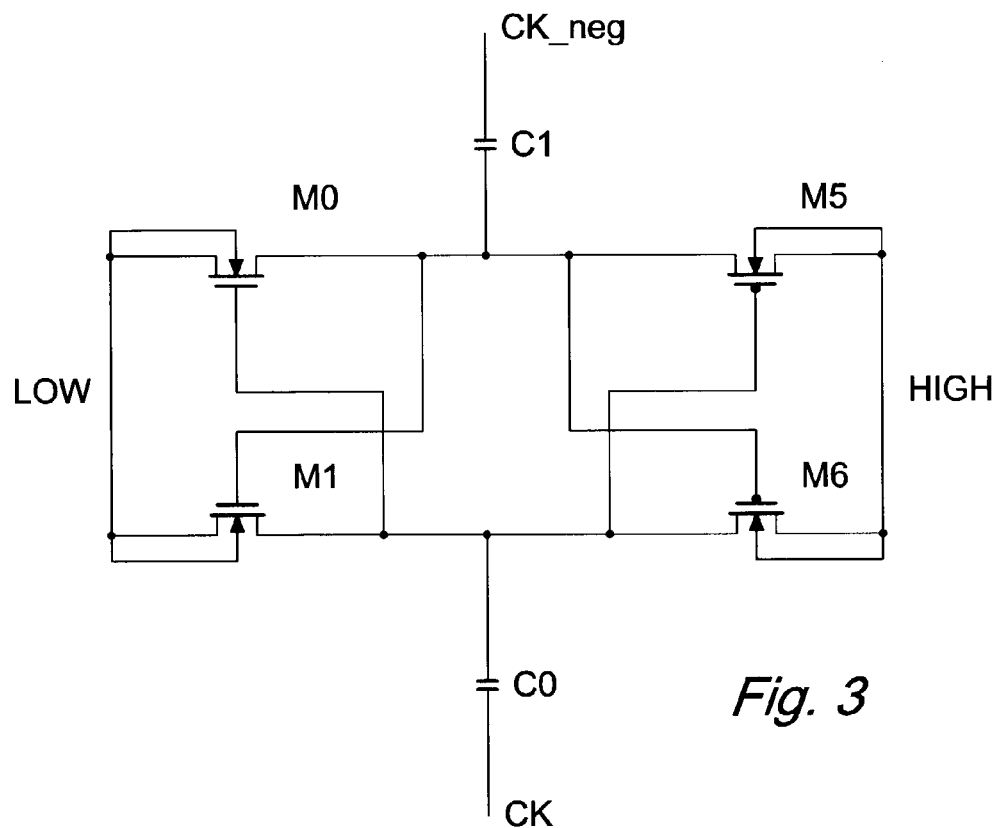
FIG. 3 is the diagram of a stage of a known type of two-phase charge pump circuit.
Figure 4:
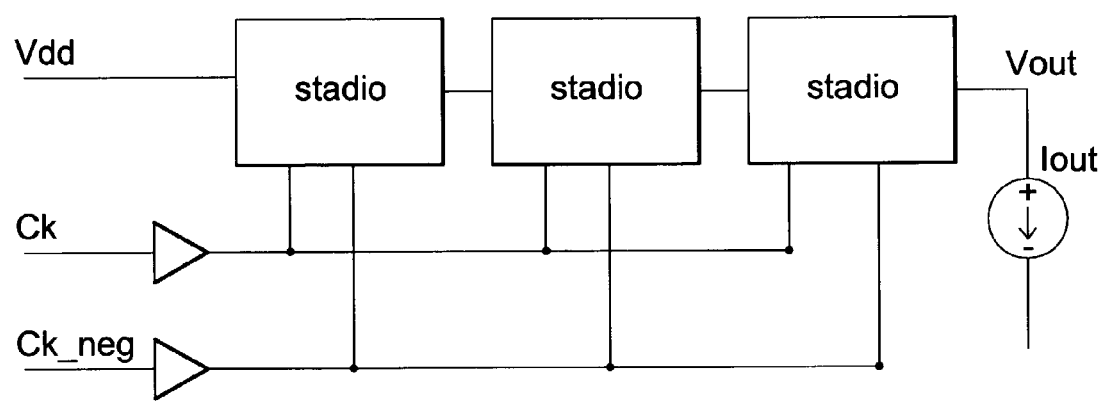
FIG. 4 is a diagram of a known type of three-stage two-phase charge pump circuit.
Figure 5:
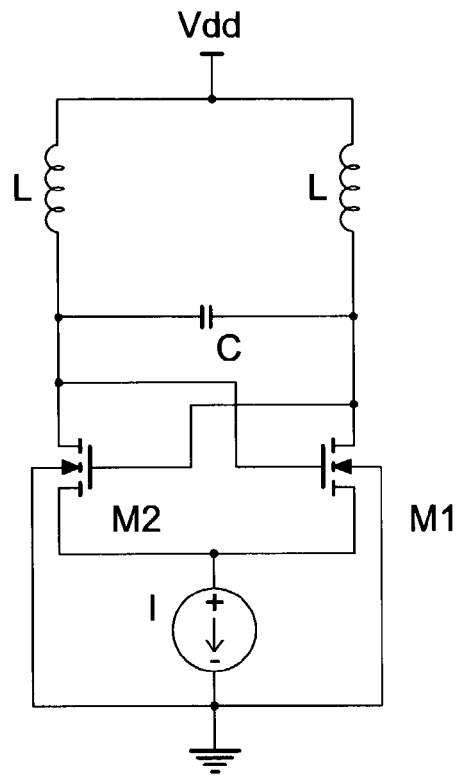
FIG. 5 is a diagram of a known type of LC oscillator.

The step-up converter according to the first embodiment adopts an LC sinusoidal oscillator with negative differential resistance, as shown in FIG. 5, widely used in integrated RF technologies.

The availability of a sinusoidal source allows to utilize to the fullest extent the frequency response characteristics of the integrated transformer, which has a voltage gain peak proximate to the resonance frequency.

In the circuit shown in FIG. 6, the inductors of the LC oscillator, designated by L in FIG. 5, are replaced with primary windings P1 and P2 of two integrated transformers 10 and 11, whose secondary windings S1 and S2 are connected as described hereinafter.

The primary windings of the transformers 10 and 11, designated by P1 and P2, are respectively connected to the supply voltage $V_{dd}$ as regards the primary windings P1 and to MOS transistors M1 and M2 respectively for the primary winding P2 of the transformer 10 and the primary winding P2 of the transformer 11.

The gate terminals of the MOS transistors M1 and M2 are conveniently connected to the primary winding P2 of the transformer that is opposite to the one to which the MOS transistors M1 and M2 are respectively connected.

A third MOS transistor M3 is connected by means of its drain terminal to the source terminals of the MOS transistors M1 and M2. Said MOS transistors M1 and M2, together with the MOS transistor M3, have their body terminals connected to the ground. In the case of triple-well MOS transistors M1 and M2, the bulk terminals can be connected to the source in order to limit the body effect.

The gate terminal of the transistor M3 instead receives a control voltage Vc.

The reference numeral 12 in FIG. 6 designates a load of the resistive-capacitive type driven by the step-up converter.

Diodes D1 and D2, connected in series to the secondary winding S2 of the transformer 10 and connected to the secondary winding S1 of the transformer 11, together with the capacitor C connected between the gate terminal and the drain terminal of the MOS transistors M1 and M2 and the line that connects the secondary winding respectively S1 of the transformer 11 and the cathode of D1 are meant to increase the voltage on the cathode of the diode D1 in order to improve the performance of the converter.

An additional diode D3 is interposed between the secondary winding S2 of the transformer 11 and the load 12 driven by the step-up converter according to the invention.

The converter is self-resonating, since the oscillation that is established is due entirely to the inductive and capacitive (parasitic) effects of the transformers, without the need for additional reactive components. The advantage of self-resonance is that frequency tuning is not necessary and compensations of any process variations are not necessary.

The step-up converter has an efficiency, including all losses including the oscillator, of 16.2% with an output at 10 V, without any need for a clock signal.

The efficiency was determined as a ratio between the power supplied to the load 12 and the power delivered by the supply (product of the supply voltage and the average current absorbed by the converter).

The main advantage of the proposed solution is the occupation of area, with an extremely great reduction with respect to the voltage boosters currently in use.

Figure 7:
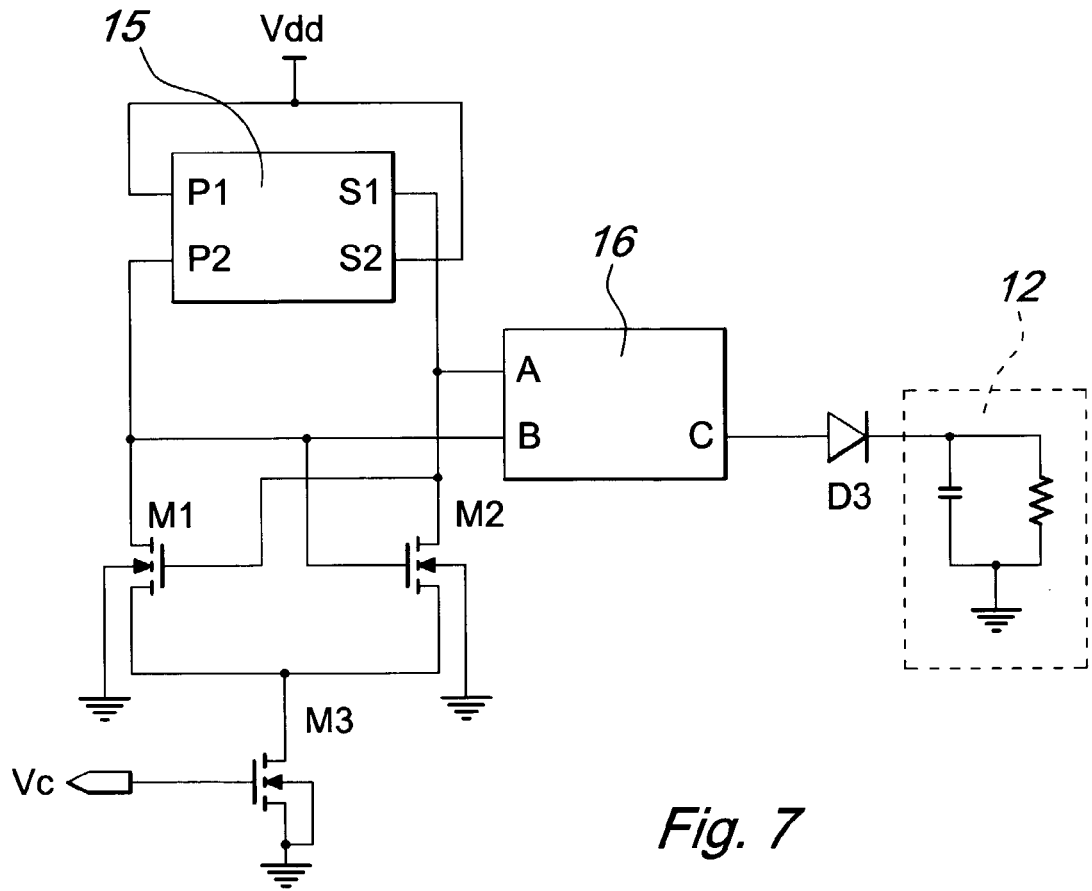
FIG. 7 is a schematic view of a second embodiment of the step-up converter according to the present invention.
Figure 8:
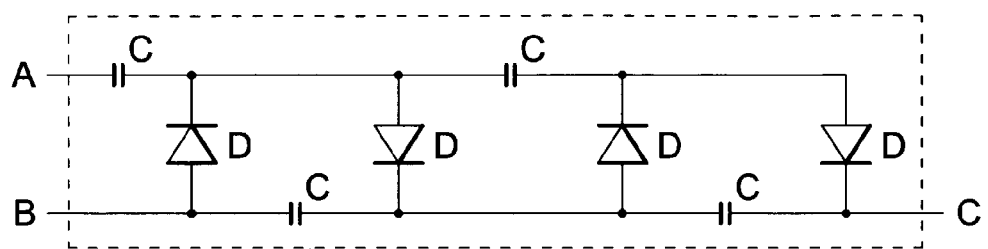
FIG. 8 is a schematic view of a voltage multiplier used in the step-up converter of FIG. 7.

The second embodiment of the step-up converter according to the present invention is instead shown in FIG. 7, and in this case the LC oscillator uses, as inductive elements, the primary and secondary windings of a single transformer 15, designated by a different reference numeral than the transformers 10 and 11 described earlier but executed in a similar manner. The resulting sinusoidal voltage is amplified by a conventional voltage multiplier 16 (charge pump) with diodes and capacitors, as shown in FIG. 8, with diodes D and capacitors C. Essentially, in the second embodiment of the invention the transformer 15 is connected by means of the secondary winding S1 to the drain terminal of the MOS transistor M2, by means of the primary winding P1 to the secondary winding S2 and to the power supply terminal $V_{dd}$, and by means of the primary winding P2 to the drain terminal of the transistor M1.

Both embodiments require from outside only the supply voltage $V_{dd}$ and can provide an oscillator control pin Vc, in order to switch on and off the converter in order to adjust the output voltage by analog means (for example in order to maintain a stable output voltage as the load conditions vary).

Figure 9:
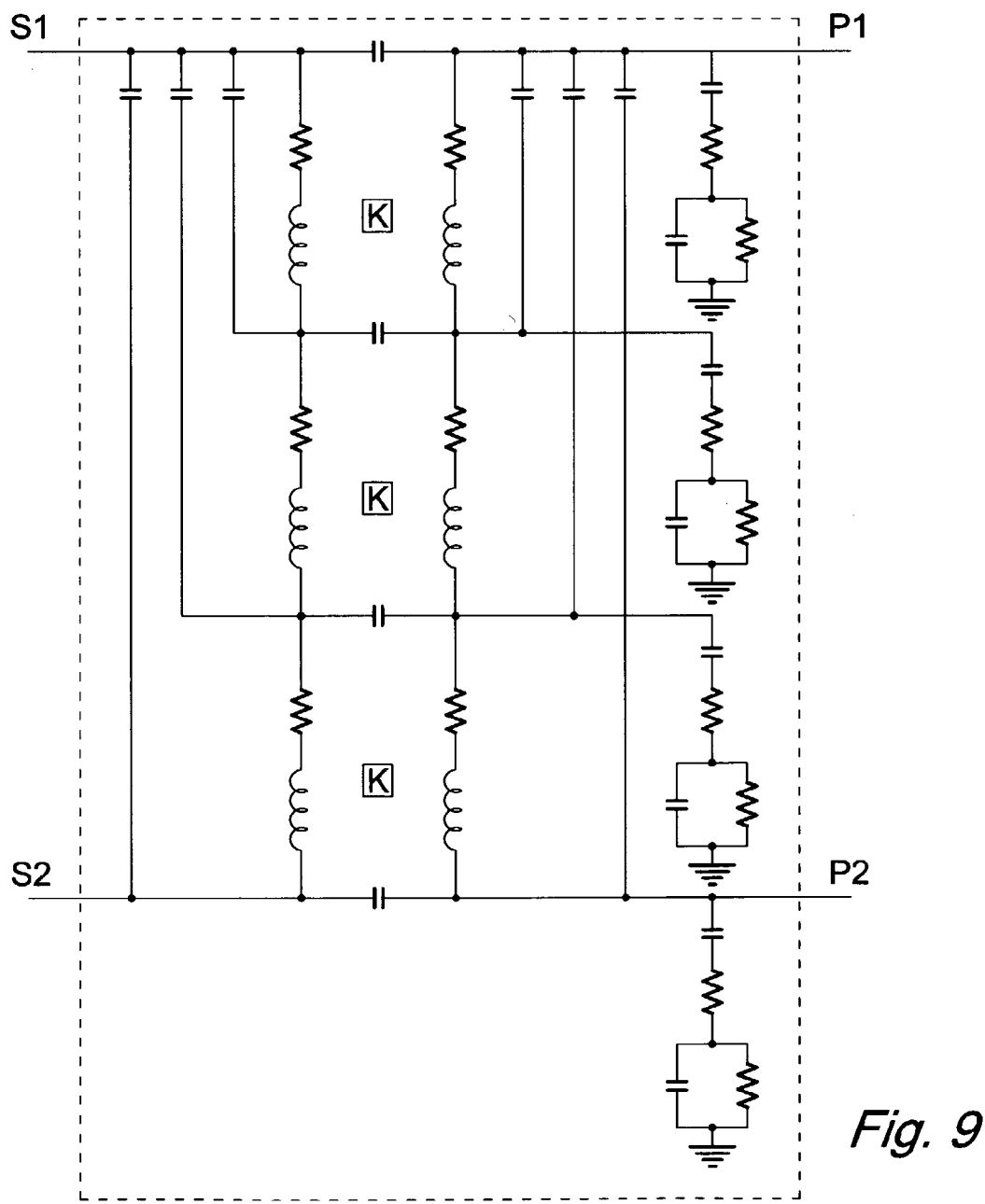
FIG. 9 is a view of the circuit model of the transformer used in the converters shown in FIGS. 6 and 7.

FIG. 9 is a schematic view of the circuit model of the transformer 10 and 11 and also of the transformer 15 used in the first and second embodiments of the converter according to the present invention. P1, P2 and S1 and S2 designate respectively the terminals of the primary and secondary windings of the transformer.

The model of the transformer is constituted by three mutually identical stages.

Essentially, the step-up converter according to the present invention, both in the first embodiment and in the second embodiment, allows a reduction in the area occupied on the chip with respect to voltage boosters of the known type and also allows to have a shorter output voltage rise time than known types of circuit, for an equal driven equivalent load.

Moreover, both of the illustrated embodiments provide an oscillator control pin for switching on and off the converter and for adjusting the output voltage by analog means.

In practice it has been found that the step-up converter according to the present invention fully achieves the intended aim and objects.

The converter according to the invention is susceptible of numerous modifications and variations, all of which are within the scope of the appended claims; all the details may further be replaced with other technically equivalent elements.

What is claimed is:

1. A step-up converter, comprising:
an input for receiving a fixed supply voltage;
a self-resonating oscillator circuit coupled to the input that has an LC circuit consisting of inductive elements and parasitic capacitances constituted by primary and secondary windings of a first integrated circuit transformer and a second integrated circuit transformer wherein the first and second transformers are not magnetically coupled to each other; and
an output coupled to the secondary winding of the second integrated circuit transformer for supplying an output voltage which is stepped-up from the received fixed supply voltage.

2. The step-up converter according to claim 1, wherein a first terminal of a primary winding of said first integrated circuit transformer is connected to a first terminal of a primary winding of said second integrated circuit transformer and to the input receiving the fixed supply voltage, a second terminal of said primary winding of said first integrated circuit transformer is coupled to a first MOS transistor of said oscillator circuit, a first terminal of a secondary winding of said first integrated circuit transformer is coupled to said first MOS transistor, a second terminal of said secondary winding of said first integrated circuit transformer is coupled to a first terminal of a secondary winding of said second integrated circuit transformer, a second terminal of said secondary winding of said second integrated circuit transformer is coupled to the output, and a second terminal of said primary winding of said second integrated circuit transformer is coupled to a second MOS transistor of said oscillator circuit.

3. The step-up converter according to claim 2, wherein said first and second MOS transistors are connected to the drain terminal of a third MOS transistor.

4. The step-up converter according to claim 3, wherein said third MOS transistor is supplied at a gate terminal thereof with a control voltage.

5. The step-up converter according to claim 2, further comprising a first diode and a second diode that are connected in series between said secondary winding of said first integrated circuit transformer and said secondary winding of said second integrated circuit transformer.

6. The step-up converter according to claim 5, further comprising a capacitor that is connected between said first and second MOS transistors and a line for connection between said secondary winding of said first integrated circuit transformer and said secondary winding of said second integrated circuit transformer.

7. The step-up converter according to claim 5, comprising a third diode that is interposed between said second integrated circuit transformer and said load.

8. The step-up converter of claim 1, wherein:
a first terminal of a primary winding of said first integrated circuit transformer and a first terminal of a primary winding of said second integrated circuit transformer are coupled to the input receiving the fixed supply voltage; and
the step-up converter further comprises:
a first transistor having a first conduction terminal coupled to a second terminal of said primary winding of said first integrated circuit transformer and a control terminal coupled to a second terminal of said primary winding of said second integrated circuit transformer;
a second transistor having a first conduction terminal coupled to said second terminal of said primary winding of said second integrated circuit transformer and a control terminal coupled to said second terminal of said primary winding of said first integrated circuit transformer.

9. The step-up converter of claim 8, wherein a first terminal of a secondary winding of said first integrated circuit transformer is coupled to said first conduction terminal of said first transistor.

10. The step-up converter of claim 9, wherein a second terminal of said secondary winding of said first integrated circuit transformer is coupled to a first terminal of a secondary winding of said second integrated circuit transformer.

11. The step-up converter of claim 10, further comprising one or more diodes coupled between said second terminal of said secondary winding of said first integrated circuit transformer and said first terminal of said secondary winding of said second integrated circuit transformer.

12. The step-up converter of claim 8, further comprising a third transistor coupled between a second conduction terminal of said first transistor and a second reference voltage level, and between a second conduction terminal of said second transistor and said second reference voltage level, a conduction terminal of said third transistor being coupled to a control voltage.

13. The step-up converter according to claim 1 wherein the converter, including the integrated circuit transformer, is fabricated on an integrated circuit chip.

14. A step-up converter comprising:
an input for receiving a fixed supply voltage;
a self resonating oscillator circuit comprising:
   a first and second MOS transistors whose gates and first conduction terminals are cross-coupled;
   a third MOS transistor whose drain terminal is coupled to second conduction terminals of said first and second MOS transistors; and
   an integrated circuit transformer having a primary and a secondary winding, one end of the primary winding coupled to one of the first conduction terminals of the first and second MOS transistors and one end of the secondary winding coupled to the other of the first conduction terminals of the first and second MOS transistors, the other ends of the primary and secondary windings being coupled to each other and to the input receiving the fixed supply voltage; and
an output coupled to the self resonating oscillator circuit for supplying an output voltage which is stepped-up from the received fixed supply voltage.

15. The step-up converter according to claim 14, wherein a multiplier circuit is interposed between said transformer and the output.

16. The step-up converter according to claim 15, wherein said multiplier circuit is coupled by means of a first terminal and a second terminal respectively to the first conduction terminals of the first and second MOS transistors for said oscillator circuit and by means of a third terminal to said output.

17. The step-up converter according to claim 15, comprising a diode that is interposed between said multiplier circuit and said output.

18. The step-up converter according to claim 14 wherein the converter, including the integrated circuit transformer, is fabricated on an integrated circuit chip.

19. A circuit, comprising:
an input for receiving a fixed supply voltage;
a self-resonating oscillator circuit with an integrated circuit transformer having a primary winding and a secondary winding, a pair of cross-coupled transistors wherein a first conduction and gate terminal in the pair is coupled to one terminal of the primary winding and a second conduction and gate terminal in the pair is coupled to one terminal of the secondary winding the other terminals of the primary and secondary windings being connected to each other and the input receiving the fixed supply voltage; and
an output circuit coupled to the first and second conduction terminals and operable to output a voltage which is stepped-up from the fixed supply voltage through a diode.

20. The circuit of claim 19, wherein at least one winding of the integrated circuit transformer forms part of an LC sinusoidal oscillator with the cross-coupled transistors in the circuit.

21. The circuit of claim 19, wherein the output circuit comprises a charge pump circuit.

22. The circuit of claim 19, wherein the self-resonating oscillator circuit is fabricated on an integrated circuit chip.

23. A circuit, comprising:
an input for receiving a fixed supply voltage;
a self-resonating oscillator circuit including:
   a first integrated circuit transformer having a first terminal of a primary winding connected to the input;
   a second integrated circuit transformer having a first terminal of a primary winding connected to the input and a terminal of a secondary winding outputting a stepped-up voltage output;
   a first transistor having a first conduction terminal coupled to a second terminal of the primary winding of the first integrated circuit transformer, a control terminal coupled to a second terminal of the primary winding of the second integrated circuit transformer and a second conduction terminal;
   a second transistor having a first conduction terminal coupled to the second terminal of the primary winding of the second integrated circuit transformer, a control terminal coupled to the second terminal of the primary winding of the first integrated circuit transformer and a second conduction terminal; and
   a third transistor coupled between the second conduction terminals of the first and second transistors and a reference voltage level, a control terminal of the third transistor being coupled to a control signal.

24. The circuit of claim 23, wherein a secondary winding of the first integrated circuit transformer and a secondary winding of the second integrated circuit transformer are coupled together, and a diode is connected between the secondary winding of the second integrated circuit transformer and a load for the circuit.

25. The circuit of claim 23, wherein a terminal of the secondary winding of the first integrated circuit transformer is coupled to the first conduction terminal of the first transistor.

26. The circuit of claim 23, wherein a terminal of the secondary winding of the first integrated circuit transformer is coupled to a terminal of the secondary winding of the second integrated circuit transformer.

27. The circuit of claim 26, further comprising at least one diode coupled between the terminal of the secondary winding of the first integrated circuit transformer and the terminal of the secondary winding of the second integrated circuit transformer.

28. The circuit of claim 26, further comprising a capacitive element coupled between the terminal of the secondary winding of the second integrated circuit transformer and the control terminal of the first transistor.

29. The step-up converter according to claim 23, wherein said third MOS transistor is supplied at a gate terminal thereof with a control voltage.

30. The circuit of claim 23, wherein the self-resonating oscillator circuit is fabricated on an integrated circuit chip.

31. The step-up converter according to claim 23, wherein the converter, including the integrated circuit transformer, is fabricated on an integrated circuit chip.

* * * * *